United States Patent [19]
Wolf et al.

[11] Patent Number: 5,312,679
[45] Date of Patent: May 17, 1994

[54] NICKEL CATALYZED CARBON INFILTRATION OF CARBON FIBER SUBSTRATES

[75] Inventors: Eduardo E. Wolf, Granger, Ind.; Paul McAllister, Houston, Tex.

[73] Assignee: Unitersity of Notre Dame du Lac, Notre Dame, Ind.

[21] Appl. No.: 930,861

[22] Filed: Aug. 14, 1992

[51] Int. Cl.$^5$ ............................................. D04H 1/58
[52] U.S. Cl. .................................. 428/289; 428/408; 427/249; 427/255.1
[58] Field of Search .......................... 427/249, 255.1; 428/408, 289, 249, 255.1

[56] References Cited
U.S. PATENT DOCUMENTS 5,202,158  4/1993  Sakagami et al. ................ 427/185
5,215,689  6/1993  Shioyama et al. ............... 264/29.5

*Primary Examiner*—George F. Lesmes
*Assistant Examiner*—Chris Ramund
*Attorney, Agent, or Firm*—Leo H. McCormick, Jr.; Larry J. Palguta; Robert A. Walsh

[57] ABSTRACT

A catalytic carbon formation technique in a carbon fiber substrate is disclosed. The carbon fiber substrate is first impregnated with a catalyst and is thereafter heated in an atmosphere rich in carbon and hydrogen. The catalyst is typically a Group VIII metal and may be selected from the group consisting of iron, nickel and cobalt. An incipient wetness technique for impregnating the substrate is also disclosed. A salt of the catalyst is provided in solution and void volume of the substrate is determined. The carbon fiber is then impregnated with a volume of the solution which is incrementally less that the determined void volume.

4 Claims, 2 Drawing Sheets 5,312,679

NICKEL CATALYZED CARBON INFILTRATION OF CARBON FIBER SUBSTRATES

SUMMARY OF THE INVENTION

The present invention relates generally to catalytic material formation of materials such as carbon, and more particularly to a process of depositing additional carbon within a porous carbon substrate by chemical vapor infiltration techniques.

The prior art recognizes utilization of a methane atmosphere for chemical vapor infiltration of carbon to densify porous carbon fiber substrates. Other, typically pyrolysis, techniques have been suggested. All or these prior art techniques suffer from one or more of the following defects: the resulting carbon distribution is nonuniform; relatively high temperatures and low pressures are required; undesirably high quantities of waste materials are generated; and the processes are generally too slow which results in high production costs.

In the development of the present invention, initial attempts by the inventors involved a catalyst-free substrate heated in an atmosphere of propylene ($C_3H_6$) and helium. Subsequently, the substrate was impregnated with a nickel catalyst, by immersing it in a methanol solution of nickel nitrate and then heating it to drive off the solvent. Additional heating in a hydrogen containing atmosphere then reduced the nickel nitrate to catalytic nickel. Poor catalyst distribution and, therefor, nonuniform carbon distribution resulted.

Among the several objects of the present invention may be noted the provision of an improved carbon-carbon composite; the provision of an improved technique for the chemical vapor infiltration of carbon; the provision of a technique of catalytic carbon formation which utilizes a unique incipient wetness technique for more uniformly distributing a catalyst within a substrate; the provision of a technique for uniformly densifying a porous carbon substrate; the addition of hydrogen to a carbon rich atmosphere in a chemical vapor infiltration process to delay deactivation of catalyst particles; the general easing of operating conditions such as pressure, temperature and time during a chemical vapor infiltration process; a reduction in the generation of waste products generated during a chemical vapor infiltration process; and the provision of overall improvements in nickel catalyzed carbon infiltration techniques. These as well as other objects and advantageous features of the present invention will be in part apparent and in part pointed out hereinafter.

In general, a process of forming a carbon-carbon fiber composite by chemical vapor infiltration technique includes impregnating a carbon fiber substrate with a catalyst, and placing the catalyst impregnated substrate in an atmosphere containing propylene ($C_3H_6$) and hydrogen. The inclusion of hydrogen in the reaction gas vastly enhances the quantity of carbon deposited in the substrate. The impregnating of the substrate may be accomplished by providing a solution of a salt of the catalyst, determining the void volume of the substrate, and impregnating the carbon fiber with a volume of the solution which is incrementally less than the determined void volume. In one preferred form, the impregnated substrate is heated to evaporate the solvent and reduce the catalyst salt leaving the catalyst in the substrate, and subsequently the catalyst impregnated substrate is heated in a reaction atmosphere containing propylene and hydrogen.

Also in general and in one form of the invention, a process of impregnating a porous substrate with a catalyst includes determining the void volume of the substrate and them impregnating the porous substrate with a volume of catalyst compound containing liquid which is incrementally less than the determined void volume. The catalyst compound containing liquid is thereafter converted to its catalytic form. In a preferred form, the catalyst compound containing liquid comprises a solution of a salt of the catalyst and the step of converting includes the steps of heating the impregnated substrate to evaporate the solvent and to reduce the catalyst salt leaving the catalyst in the substrate. Nickel nitrate is one preferred catalyst salt.

BRIEF DESCRIPTION OF THE DRAWING

Corresponding reference characters indicate corresponding parts throughout the several views of the drawing.

The exemplifications set out herein illustrate a preferred embodiment of the invention in one form thereof and such exemplifications are not to be construed as limiting the scope of the disclosure or the scope of the invention in any manner.

DESCRIPTION OF THE PREFERRED EMBODIMENT

Figure 1:
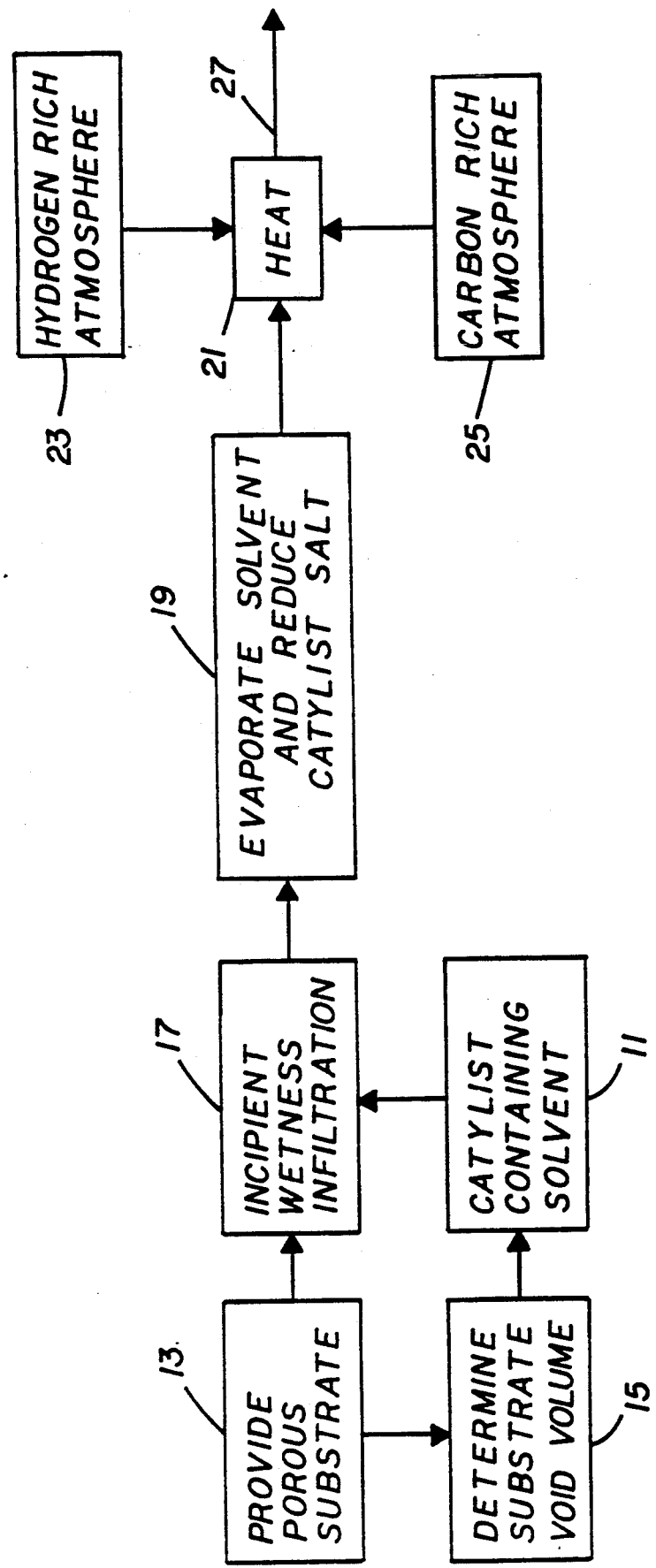
FIG. 1 is schematic block diagram of one process implementing the present invention.

In general, and with reference to FIG. 1, the present inventive technique of catalytic carbon formation in a carbon fiber substrate begins with the provision of a solution of a salt 10 of the catalyst, such as a methanol solution of nickel nitrate, at 11 and the provision of a substrate such as a carbon fiber material at 13. Other Group VIII metals may be used as the catalyst with iron, nickel or cobalt being preferred. The void volume of the substrate is determined experimentally for the particular substrate material at 15. The carbon fiber substrate is then impregnated with a volume of the solution which is incrementally less than the determined void volume, i.e., to the point of incipient wetness, but is not "wet" with the solution as at 17. The solvent is then evaporated and the salt reduced to its catalytic (metallic) form at 19. Next, at 21, the catalyst impregnated substrate is heated in an atmosphere which is rich in both hydrogen 23 and carbon 25. Typically, the carbon source is propylene. The evaporation of the solvent may be by air drying while reduction of the catalyst salt may be performed in a hydrogen/helium atmosphere. This reduction and the subsequent step 21 of heating in a carbon and hydrogen rich atmosphere may take place in a common vessel.

EXAMPLES

Figure 2:
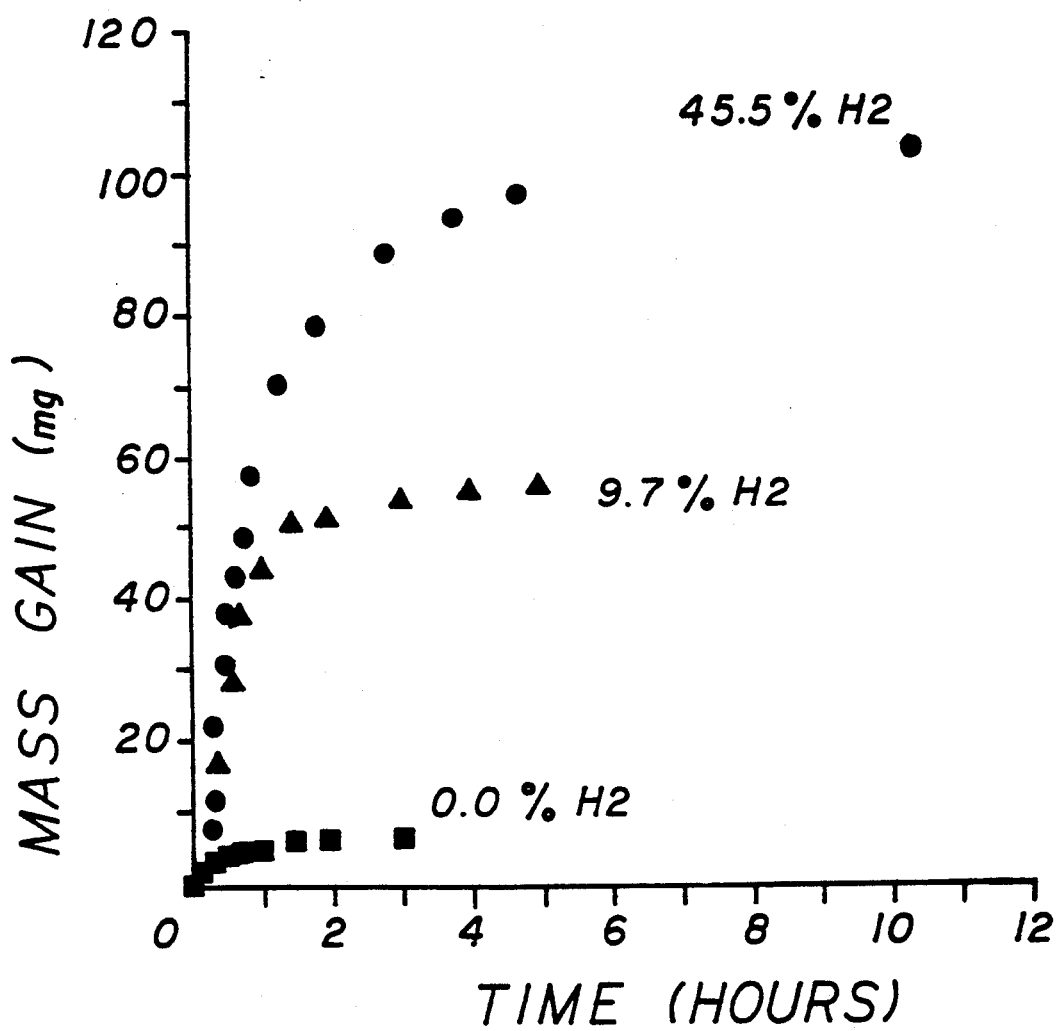
FIG. 2 is a graph showing comparative rates of mass gain achievable with the present invention.

The following examples illustrate suitable components and conditions which may be employed generally in accordance with the techniques depicted in FIG. 1 to densify porous carbon fiber substrates. In each case, the catalyst containing solvent is $Ni(NO_3)_2 \cdot 6H_2O$ in methanol with concentrations ranging from 500 ppm to 50,000 ppm. In each case, the substrates were air dried for at 95 degrees C. least 2 hours. After air drying, the catalyst containing substrate was placed in a vessel, evacuated, and flushed twice with helium. In all the examples, vessel temperature was raised to 500 degrees C. and held at that temperature for 30 minutes to reduce the catalyst salt. Raising the temperature of the vessel and its contents to that temperature typically required an additional 15 minutes. In each case, the vessel was maintained at atmospheric pressure during both reduction of the catalyst salt and the subsequent heating in the carbon rich atmosphere. In all the examples, propylene was used to provide the carbon rich atmosphere and the carbon fiber substrate was a carbonized felt with a surface area weighed about $1m^2/g$ and volumetric void fractions of 0.9. The rayon felt substrates used were uniform sized cylinders 0.6 cm in length, 0.6 cm in diameter and weighed about 15 mg. These cylinders were injected with 0.175 ml of the nickel solution (0.719 mg Ni). The mass gain as a function of time for each example is shown in FIG. 2.

EXAMPLE I

The reaction atmosphere supplied to the substrate during the step 21 of heating was 10% propylene and 90% helium.

EXAMPLE II

The same as EXAMPLE I except the reaction atmosphere was 9.7% hydrogen, 10% propylene and 80.3% helium.

EXAMPLE III

The same as EXAMPLE I except the reaction atmosphere was 45.5% hydrogen, 10% propylene and 44.5% helium.

Other examples may be found in the Inventors' paper entitled Ni Catalyzed Carbon Infiltration of Carbon Fiber Substrates published in CARBON, Vol. 30, No. 2, pages 189–200 (1992). This paper and the resulting invention were the result of experimental work performed at the University of Notre Dame Department of Chemical Engineering.

From the foregoing, it is now apparent that a novel carbon infiltration technique has been disclosed meeting the objects and advantageous features set out hereinbefore as well as others, and that numerous modifications as to the precise shapes, configurations and details may be made by those having ordinary skill in the art without departing from the spirit of the invention or the scope thereof as set out by the claims which follow.

We claim:

1. A process of impregnating a porous carbon substrate with a catalyst comprising the steps of:
   determining the void volume of the substrate;
   selecting said catalyst from a group consisting of iron, nickel and cobalt;
   providing a solution of a salt of the catalyst and a liquid;
   impregnating the porous substrate with a volume of catalyst compound containing liquid which is incrementally less that the determined void volume; and
   heating said catalyst impregnated substrate in an atmosphere rich in carbon and hydrogen to evaporate said liquid and to reduce the catalyst salt leaving the catalyst in the substrate.

2. A process of forming a carbon-carbon fiber composite by chemical vapor infiltration technique comprising the steps of:
   selecting a catalyst from a group consisting of iron, nickel, and cobalt;
   providing a solution of a salt of the catalyst and a solvent;
   determining the void volume of a carbon fiber substrate;
   impregnating said carbon fiber substrate with said solution which is incrementally less that the determined void volume;
   placing the catalyst impregnated substrate in an atmosphere containing propylene and hydrogen;
   heating the catalyst impregnated substrate in the propylene and hydrogen atmosphere to evaporate the solvent and reduce the catalyst salt leaving the catalyst in the substrate.

3. The process of claims 1 or 2 wherein the solution of a salt of the catalyst is a methanol solution of nickel nitrate.

4. A carbon-carbon fiber composite made according to the process of claim 1 or 2.

* * * * *